United States Patent Office 2,960,615
Patented Nov. 15, 1960

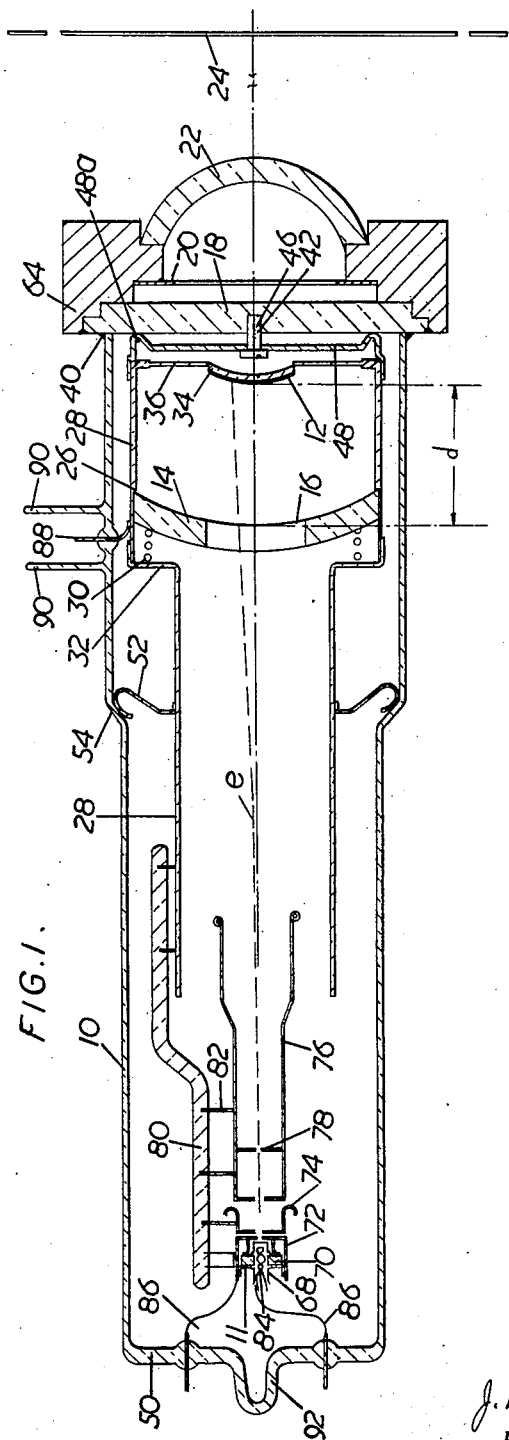

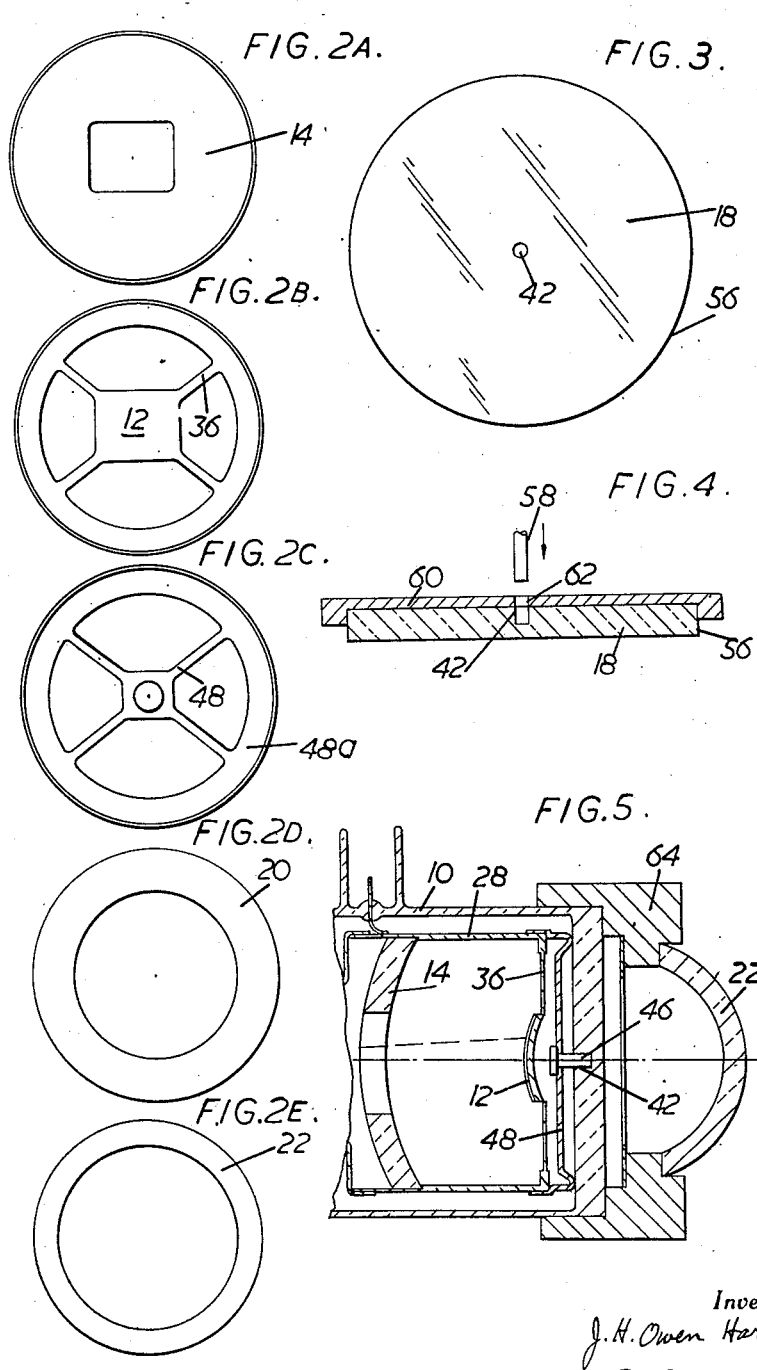

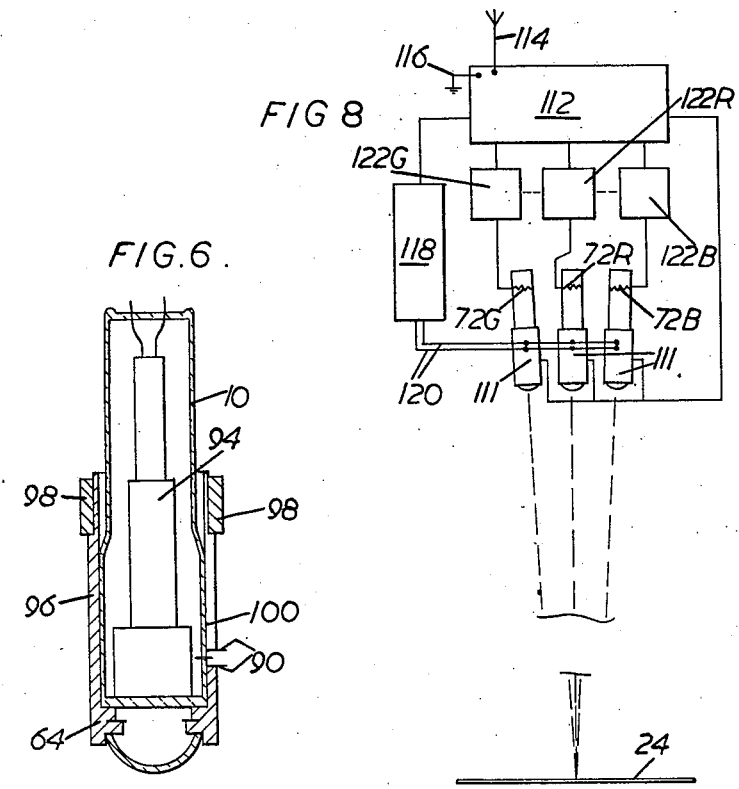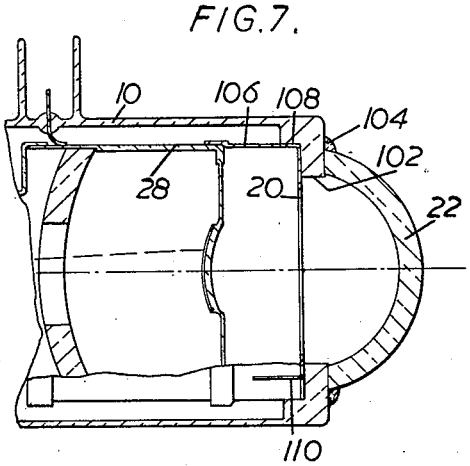

2,960,615

ELECTRON DISCHARGE TUBES FOR FORMING IMAGES ON DISPLAY SCREENS

John Henry Owen Harries, Warwick, Bermuda, assignor to Harries Television Research Limited Filed Dec. 15, 1958, Ser. No. 780,421

Claims priority, application Great Britain Dec. 18, 1957

25 Claims. (Cl. 313—64)

This invention relates to electron discharge tubes and optical systems for television, radar and the like.

Display systems for television, radar and the like have been proposed in which an electron image or raster is produced on a phosphor screen in an electron discharge tube, and an optical image of the electron image or raster is projected on to a viewing screen by an optical system which is external to the glass envelope of the discharge tube.

However, such systems have not achieved a marked degree of commercial success, and this seems to have been because they have been too costly and also because they have failed to produce enough light. The optical systems which have been used do not transmit enough of the light which they receive from the associated tubes, and the tubes have not presented a bright enough optical object (i.e. the picture on the face of the tube) to the optical system. As a result, it has generally been necessary to view the projected image in a dim light. This defect applies with much greater force to the projection of colour television pictures on to a screen remote from the tube or tubes on which the picture or pictures are generated, because the available phosphors for the component colours have a much lower efficiency than the phosphors used for black-and-white pictures.

A form of cathode ray tube has been proposed in which a spherical mirror and a curved phosphor are inside the vacuum envelope, so that the light from the phosphor is projected by the mirror through a window in the envelope to a viewing screen.

The use of such a tube in a projection receiver would enable the production of a brighter image on the viewing screen because in such a tube the optical system receives light directly from that side of the phosphor screen which is struck by the electrons, without an intervening glass plate, and because less of the light is intercepted than in a conventional television projection receiver employing a Schmidt optical system. Severe difficulties are found in positioning and holding the optical elements within the vacuum tube in such a way that they are in accurate relative alignment and so that at the same time allowance is made for the expansivity of the materials due to heating which occurs during manufacture and use.

According to the present invention, the phosphor screen and concave mirror are mounted with a common support member and the tube includes a locating member fixed behind the phosphor screen, the locating member and support member being mounted for relative axial sliding motion by means of an axial pin-and-socket connection. Resilient means are provided to urge the pin into the socket, the engagement of the pin and socket acting to constrain the support member with respect to movements transverse to the optical axis. The locating member may also have a supporting surface transverse to the optical axis of the tube, against which bears a locating device fixed to the common support member.

In order that the invention may be better understood, an embodiment thereof will now be described by way of example, with reference to the accompanying drawings, in which:

Figure 1 shows in section an electron discharge tube according to the invention;

Figures 2A to 2E and 3 are front views of parts of the tube shown in Figure 1;

Figure 4 illustrates a method of forming an accurately centered locating hole in the faceplate of the tube shown in Figure 1;

Figures 5 and 7 show parts of alternative constructions of tubes according to the invention;

Figure 6 represents a tube according to the invention in which means are provided for accurately locating the deflection coils with respect to the optical system; and Figure 8 illustrates diagrammatically a colour television receiver employing electron discharge tubes according to the invention.

Figure 1 shows in cross-section the electron discharge tube with its associated optical components. Within a vacuum envelope 10, which is of glass, an electron gun 11 which may be of conventional design is directed at a convex phosphor screen 12, electrostatic deflection electrodes or magnetic deflection coils (omitted from Figure 1 for the sake of clarity) being provided to enable the beam to form an electron image or raster on the phosphor screen. A concave spherical mirror 14 is arranged between the electron gun 11 and the phosphor screen 12 and is provided with a central aperture 16 through which passes the electron beam $e$ from the gun 11 on its way to the phosphor screen 12. The spherical mirror 14, which is axially arranged with respect to the electron gun and phosphor screen, faces the phosphor screen and reflects light from the latter back past the phosphor screen and through the transparent faceplate 18 of the envelope. After emerging from the vacuum envelope the light rays pass through a limiting aperture 20 and a meniscus 22 and then travel to the viewing screen 24 on which they form a magnified image of the picture on the phosphor screen 12.

The spherical mirror 14, which is shown in axial view in Figure 2A, is supported on a ledge 26 on the inside of a metal cylinder 28, and is retained in position by the pressure of a helical spring 30 bearing against a shoulder 32 in the metal cylinder. The mirror 14 may consist of glass with an aluminised reflective surface facing the phosphor screen, its remaining surfaces being given a conductive coating (for example, colloidal graphite) which is in electrical contact with the aluminising at the edges of the mirror. The conductive coating is electrically connected to the cylinder 28 through the spring 30. This prevents the accumulation of charge on the glass mirror, which would disturb the electron beam.

The phosphor screen 12 is supported on a metal backing 34 which is of spherical curvature and which is connected to the metal cylinder 28 by means of spider arms 36, which are so arranged that the obstruction which they present to light rays passing through the system is as small as possible. An axial view of the phosphor screen and its mount is shown in Figure 2B. The phosphor screen is so positioned that it coincides over its entire area with the spherical object field of the spherical mirror. The distance $d$ between the spherical mirror and the phosphor screen is fixed during manufacture.

It will be seen that the electron beam strikes the phosphor on the same side as the phosphor is viewed by the optical system. This results in a considerable improvement in the amount of light received by the optical system, as compared with display devices having wholly external projection systems. The optical path is no longer obscured by the tube as a whole although some shadowing is still caused by the phosphor screen and its spider mount.

In the preferred embodiment of the invention the phosphor is supported on a metlalic backing and is connected by means of the spider arms to metal electrode areas which radiate heat effectively. As a result the phosphor does not overheat during use and is capable of supporting a much greater power dissipation per unit area than is the case with phosphors supported on glass as in the known television tubes. In the construction shown the metal electrode is constituted by the metal cylinder within which the mirror and screen are mounted, and this cylinder is preferably blackened to improve its heat radiation. Stainless steel may be used for the phosphor mount, and also for the spider arms and the cylinder.

If desired the metal cylinder 28 to which the phosphor mount is connected may be connected to a heat sink (for example, a water- or air-cooled element) outside the envelope of the discharge tube or may be conductively connected for heat flow to fins or further areas of metal within the discharge tube which are preferably blackened and arranged to radiate as much heat as possible. If a magnetic deflection system is used, the cylinder 28 should preferably have thin walls and a longitudinal gap to prevent losses due to eddy currents flowing therein. If an electrostatic deflection system is used the cylinder 28 is mod'fied to permit the insertion of the deflection plates. If desired, supporting leads for the deflection plates can be inserted through the glass walls of the envelope and through apertures in the cylinder 28.

The optimum thickness of the phosphor depends upon the kind of phosphor used and upon the electrical conditions of operation and can readily be ascertained by experiment. In a typical instance, when the phosphor electrode was maintained at a potential of about 60 kilovolts the optimum thickness was that corresponding to a density of 20 to 30 milligrammes per square centimetre of area. The grain sizes of the phosphor were less than 10 microns and it was settled upon the supporting electrode by the well-known settling methods using potassium silicate, with a small quantity of barium nitrate, as a binder.

The end of the vacuum tube envelope 10 is closed by means of a plate-glass faceplate or window 18 which may be attached to the glass envelope by means of a fillet 40 of solder glass of the kind known as Corning Solder Glass 7570. In order to exhaust the vacuum tube during manufacture it is necessary to subject it to a bake-out temperature of, typically, 300° C. for half an hour. The positioning and axial alignment of the parts (including the optical elements inside and outside the envelope) must remain unimpaired and the glass must not be cracked or crushed by the considerable expansion and contraction of all the parts of the discharge tube due to rises and falls of temperature. Temperature changes will also occur during operation of the tube. The rise and fall of the overall temperature during operation may amount to as much as 50° C. or more. To meet these requirements the electron gun and optical components within the discharge tube are supported in the following manner. The window 18 has a locating hole 42 on the optical axis 44 of the system into which locating hole a metal locating pin 46 slides. The pin 46 is spot-welded to a metal spider 48 which also supports the cylinder 28, which carries with it the phosphor screen and spherical mirror, and locates it in precise axial alignment with the face and edges of the window 18. An axial view of the spider 48 is shown in Figure 2C. As will be seen in Figure 1, the annular ring 48a surrounding the spider arms and forming the outer part of the spider 48 (Figure 2C) is curled backwards towards the window 18 before returning in a direction parallel to the sides of the envelope to provide supports for the metal cylinder. The annular area of contact of the ring 48a with the flat face of the window 18 keeps the assembly parallel to the axis of the tube. The locating hole 42 is sufficiently deep for the locating pin 46 not to touch the bottom of the hole. The pin 46, therefore, has the sole function of locating the assembly on the axis of the tube. The electrode assembly of the discharge tube is inserted into the envelope 10 through the lefthand end (Figure 1) before the moulded glass end 50 is sealed in. The assembly is retained in position and pressed up against the window 18 by four springs 52 (of which only two are shown in Figure 1) which are mounted on the cylindrical member 28 and press against a shoulder 54 in the envelope 10. In this way, the assembly as a whole is kept in contact with and correctly positioned against the window 18 and at the same time it is ensured that relative thermal expansion of the glass and metal parts will not cause distortion or breakage. The engagement of the axial pin 46 in the socket 42 contains the optical and electrical elements within the vacuum envelope with respect to movements transverse to the optical axis, and the contact of the annular ring 48a with the faceplace 18 constrains these elements with respect to rotation of the axis of the electron gun with respect to the optical axis. The ring 48a can be replaced, if desired, by three or more projections spaced about the optical axis. An axial view of the window 18 and locating hole 42 is shown in Figure 3.

The edge 56 of the window 18 is ground to a true circular form and the locating hole 42 is drilled in the exact centre of the window by means of a drilling jig as shown in Figure 4. In Figure 4 a diamond drill 58 is guided by means of a hardened steel jig 60 which fits over the window 18 so that when the diamond drill is fed in the direction of the arrow through an aperture 62 in the drilling jig 60, an accurately concentric locating hole 42 is drilled in the window 18. The diameter of the locating hole 42 should be very slightly larger than that of the locating pin 46 in order to allow for the relative expansivity of the metal pin 46 and of the glass.

A holder 64 (which is preferably made of insulating material) is located on the outside edges of the window 18 and is, therefore, accurately aligned with the phosphor screen and the spherical mirror which are inside the vacuum envelope. The holder 64, which is cemented to the window 18, supports the optical diaphragm stop 20 (which is shown in axial view in Figure 2D) and the meniscus 22, which is shown in axial view in Figure 2E. The meniscus 22 and optical diaphragm stop 20 may be held in position by cement.

The inside of the cylinder 28, the spider arms 36, the spider 48, the optical diaphragm 20 and the internal surfaces of the holder 64 should preferably be blackened.

The external holder 64 may be clamped in any suitable optical-type holder (not shown) to position the discharge tube as a whole in the correct relationship with the viewing screen 24.

The image produced on the phosphor 12, when it is scanned by the electron beam $e$, is projected by the optical system which has been described on to the viewing screen 24.

It will be seen that the glass plate 18 is used as a common locating surface for the internal and external components of the optical system. This is a convenient method of ensuring that reasonable accuracy is obtained in the axial alignment of and spacing between the parts of the optical system, including the phosphor screen, which are within and outside the vacuum envelope. Without careful attention to the alignment and spacing, deterioration of the image quality would result.

The meniscus lens 22 shown in the drawing replaces the usual corrector plate in a Schmidt optical system, which can however be used if desired. The meniscus is suitable for use with most television systems because it is capable of giving sufficiently good definition for use with such systems, and it is much less costly than a Schmidt corrector plate. It can be moulded from polymethyl methacrylate. The meniscus can alternatively be mounted inside the vacuum envelope, but in this case it should preferably be made of glass.

The meniscus can conveniently be arranged outside the vacuum envelope, as shown in the drawing, because the relative positions of the meniscus and screen and their spacing from the phosphor and mirror inside the vacuum envelope are not very critical. The same applies to the axial alignment of the meniscus and screen in relation to each other and to the phosphor and spherical mirror, considered as a unit. The distance $d$ between the spherical mirror and the phosphor and the alignment of the axes of the spherical mirror and phosphor are on the other hand very critical. As these components are included within the tube the necessary adjustments can be made during manufacture and the mirror and screen can then be fixed in the correct position.

The faceplate or window in the vacuum envelope is positioned well along the path from the spherical mirror to the screen, and away from the phosphor and the space between the phosphor and the mirror. It is thus in a position along the axis of the optical system such that the effects of any imperfections in the window upon the optical system are greatly reduced. This enables a window of relatively low optical quality to be used, if desired, without appreciable deterioration of the image. Furthermore, because the window is not close to the phosphor, the halation and loss of light which occurs in the prior apparatus is avoided. We have found in practice that, instead of using a separate faceplate as shown in Figure 1, a good moulded glass envelope with a flat face can often be used, and an example of such an arrangement will be later described. Such an arrangement is, of course, very much less costly than using an optically finished faceplate or even a plate-glass faceplate inserted into the end of the vacuum envelope.

The electron beam $e$ may be produced by any suitable known kind of electron gun. The electron gun shown diagrammatically in Figure 1 includes a cathode sleeve 68 crimped into a ceramic disc 70 within a modulator cylinder 72. First and second anodes 74 and 76 are used with a limiting diaphragm aperture 78 and with the cylindrical member 28 to produce the electron beam $e$ when suitable potentials are applied thereto. The gun electrodes can conveniently be supported by the cylindrical member 28 by means of three glass rods 80 (only one of which is shown) by means of spigots 82. Leads to the gun electrodes 68, 72, 74 and 76 and to the cathode heater 84 may be brought out through the moulded glass end of the envelope 10, as exemplified in the case of the two leads 86. The design and construction of the electron gun is in accordance with well-known principles.

The ultor potential which is applied to the cylinder 28 and, therefore, to the phosphor 12, is led in through the wall of the vacuum tube by means of the spring connector 88 which presses lightly on the outside of the cylinder 28. The tubular glass walls 90 are arranged to provide protection from relatively high potentials applied to this connector. The envelope is exhausted through the sealed-off exhaust tube 92 and the usual getter (not shown) is employed.

Figure 5 shows a modification of the tube of Figure 1 in which a moulded glass envelope is used, the front end of the envelope consisting of a moulded window in which the locating hole 42 is moulded. It is found that because the standard of definition used in commercial television is low as compared with ordinary optical practice, a moulded envelope of this kind can frequently be used without noticeable deterioration of the image quality on the viewing screen.

Figure 6 shows another moulded envelope with an integrally moulded faceplate. The internal electrodes and electron gun are indicated diagrammatically in Figure 6 by the numeral 94. The external holder 64 is cemented to the glass envelope and has an extension 96 to support magnetic deflection coils 98. These coils, which are outside the vacuum tube, are therefore located precisely with respect to the spherical mirror, phosphor screen and electron gun which are inside the vacuum tube. The moulded end of the vacuum tube thus forms a common locating surface for the deflection coils and the internal and external optical components. The slot 100 in the extension 96 is necessary in order to clear the glass members 90 (see also Figure 1) when the external holder is slid on to the envelope. As previously stated, the metal cylinder supporting the mirror and phosphor screen should have thin walls and should be provided with a longitudinal gap to reduce eddy current losses.

Figure 7 shows a modification of Figure 5 wherein the moulded glass envelope 10 has an apertured end 102 and a meniscus 22 is fixed to this end 102 by means of a fillet 104 of solder glass (Corning 7570) so that the functions of the meniscus and window are combined. Instead of the spider 48 of Figure 1, a tubular metal element 106 is arranged both to hold the tube 28 and to locate the assembly into a recess 108 in the end 102 of the moulded glass envelope. The tubular metal element also has an aperture 20 therein which acts as the limiting optical diaphragm. The annular peripheral ring of the tubular metal element 106 has slits 110 to make it flexible to allow it to fit into the annular recess 108 and at the same time to allow for the relative expansivity of the metal and glass with changes of temperature. The end of the peripheral ring abuts against the end wall of the recess. A spring is used to maintain the ring in engagement with the end wall. The inside of the tubular metal element 106 should preferably be blackened.

Figure 8 shows the use of three electron discharge tubes 111 of the kind described above which have respectively phosphors which produce green, red and blue light. The resulting red, blue and green images are combined to form a colour picture on the viewing screen 24. In Figure 8 the block 112 represents a colour television receiver with an antenna 114 and ground 116. The block 118 represents the usual synchronised scanning generators which supply the line and frame scanning potentials or currents to the deflection coils or plates of the tubes by means of links 120. Red, blue and green video signals are applied by means of circuits represented by the blocks 122G, 122R and 122B to the modulator electrodes 72G, 72R and 72B in the repective vacuum tubes. The block 118 also includes the usual circuits employed to adjust the relative shape, size and position of the three rasters on the three colour phosphors in the three discharge tubes so that the images coincide on the viewing screen 24. Any usual form of optical mount may be used to position the three discharge tubes and optical systems so that their image planes substantially coincide. The distance between the viewing screen 24 and the discharge tubes in relation to the spacing between them must be sufficient to allow of this coincidence.

The optical system and electron discharge tube can also be used for the projection of radiation other than visible light, for example ultra-violet and infra-red radiation. Examples of phosphors which emit ultra-violet light are described in a paper entitled "New Phosphors for Flying-Spot Cathode-Ray tubes," Philips Res. Rep. 7, 421–431, 1952, by A. Bril and H. A. Klasens, and a phosphor which radiates in the infra-red region is shown in, for example, Figure 2b of a paper entitled "Phosphors for Tricolour Television Tubes" Philips Res. Rep. 10, 305–318, 1955, by A. Bril and H. A. Klasens. The elements of the optical system and the faceplate of the glass envelope are chosen to transmit the desired radiation, and filters may be used if desired.

If desired, the viewing screen used can be of the image intensifier type so that a relatively low intensity image projected on the back thereof will appear as a very much brighter image on the other side of the screen.

The tube according to the invention may be of the kind in which a deflection system and the relative position of the electron gun and the phosphor screen are such that the mean path of the electron beam, that is to say the path of the electron beam when it strikes the centre of the phosphor screen, approaches the phosphor screen obliquely.

The invention can also be applied to cathode ray tube oscilloscopes.

I claim:

1. An electron discharge tube for a projection television or radar receiver or an oscilloscope, comprising a vacuum envelope having a transparent face and within which is located an electron gun, a phosphor screen and, between said phosphor screen and said electron gun, a concave mirror formed to define an aperture through which electrons pass from said gun to said phosphor screen and arranged to reflect light rays from said phosphor screen through the transparent face of said vacuum envelope, said phosphor screen and said concave mirror being mounted within a common support member, said tube further comprising a fixed locating member behind said phosphor screen, said locating member and said support member being mounted for relative axial sliding motion by means of an axial pin-and-socket connection consisting of an axial pin and a member having an axial socket formed therein and within which said pin is mounted for sliding motion, and resilient means arranged to urge said pin into said socket, the engagement of said pin and socket acting to constrain said support member with respect to movements transverse to said optical axis.

2. An electron discharge tube for a projection television or radar receiver or an oscilloscope, comprising a vacuum envelope having a transparent face and within which is located an electron gun, a phosphor screen and, between said phosphor screen and said electron gun, a concave mirror formed to define an aperture through which electrons pass from said gun to said phosphor screen and arranged to reflect light rays from said phosphor screen through the transparent face of said vacuum envelope, said phosphor screen and said concave mirror being mounted within a common support member, said tube further comprising locating means fixed within said tube, said locating means being formed of a part having an axial socket formed therein and including a supporting surface lying in a plane transverse to the axis of said tube, an axial pin mechanically connected to said common support member and mounted in said socket for sliding motion therein, a locating member mechanically connected to said common support member and arranged to bear against the said supporting surface, and resilient means arranged to urge said pin into said socket and to press said locating member upon said supporting surface, the engagement of said pin and socket and the engagement of said locating member upon said supporting surface acting to maintain said common support member in position in said tube.

3. An electron discharge tube for a projection television or radar receiver or an oscilloscope, comprising a vacuum envelope having a transparent face and within which is located an electron gun, a phosphor screen and, between said phosphor screen and said electron gun, a concave mirror formed to define an aperture through which electrons pass from said gun to said phosphor screen and arranged to reflect light rays from said phosphor screen through the transparent face of said vacuum envelope, said phosphor screen and said concave mirror being mounted within a common support member, said tube further comprising locating means fixed within said tube, said locating means being provided with an axial pin and including a supporting surface lying in a plane transverse to the axis of the tube, a locating member mechanically connected to said common support member and having an axial socket therein and in which said pin is mounted for sliding motion, a locating part mechanically connected to said common support member and arranged to bear against the said supporting surface, resilient means arranged to urge said pin into said socket and to press said locating part upon said supporting surface, the engagement of said pin and socket and the engagement of the locating part upon said supporting surface acting to maintain said common support member in position in said tube.

4. An electron discharge tube for a projection television or radar receiver or an oscilloscope, comprising a vacuum envelope having a transparent face and within which is located an electron gun, a phosphor screen and, between said phosphor screen and said electron gun, a concave mirror formed to define an aperture through which electrons pass from said gun to said phosphor screen and arranged to reflect light rays from said phosphor screen through the transparent face of said vacuum envelope, said phosphor screen and said concave mirror being mounted within a common support member, said tube further comprising a locating means fixed within said tube, said locating means including a part having an axial socket formed therein behind said phosphor screen and including a supporting surface lying in a plane transverse to the axis of said tube, an axial pin mechanically connected to said common support member and mounted in said socket for sliding motion therein, a locating member mechanically connected to said common support member and arranged to contact the said supporting surface around the axial pin-and-socket connection, and resilient means bearing against a fixed surface around the inner wall of the tube envelope to urge said pin into said socket and the said locating member against said supporting surface, said fixed surface being inwardly directed and oblique to the axis of said tube.

5. An electron discharge tube for a projection television or radar receiver or an oscilloscope, comprising a vacuum envelope having a transparent face and within which is located an electron gun, a phosphor screen and, between said phosphor screen and said electron gun, a concave mirror formed to define an aperture through which electrons pass from said gun to said phosphor screen and arranged to reflect light rays from said phosphor screen through the transparent face of said vacuum envelope, said phosphor screen and said concave mirror being mounted within a metal heat-dissipating cylinder, said tube additionally comprising locating means fixed within said tube behind said phosphor screen, said locating means including a member having an axial socket formed therein and including a supporting surface lying in a plane transverse to the axis of said tube, an axial pin connected by spider arms to said cylinder and mounted in said socket for sliding motion therein, further locating means mechanically connected to said cylinder and arranged to contact the said supporting surface around the axis of said tube, and resilient means arranged to urge said pin into said socket and to press said further locating means upon said supporting surface, the engagement of said pin and socket and the engagement of said further locating means upon said supporting surface acting to maintain said common support member in position in said tube.

6. An electron discharge tube for a projection television or radar receiver or an oscilloscope, comprising a vacuum envelope having a transparent face and within which is located an electron gun, a phosphor screen comprising a phosphor coating on a support member of high thermal conductivity and, between said phosphor screen and said electron gun, a concave mirror formed to define an aperture through which electrons pass from said gun to said phosphor screen and arranged to reflect light rays from said phosphor screen through the transparent face of said vacuum envelope, fixed internal locating means including a member having an axial socket formed therein and including a supporting surface lying in a plane transverse to the axis of said tube, supporting means for said phosphor screen comprising a heat-dissipating device, an axial pin mounted in said socket for sliding motion therein and further locating means arranged to bear against the said supporting surface, and resilient means arranged to urge said pin into said socket and to press said further locating means upon said supporting surface, the engagement of said pin and socket and the engagement of said further locating means upon said supporting surface acting to maintain said phosphor screen supporting means in position in said tube.

7. An electron discharge tube according to claim 6, in which said support member of the phosphor screen is mounted within said supporting means by means of spider arms extending outwardly from said support member.

8. An electron discharge tube according to claim 6, in which said mirror is of glass having a metallized reflecting surface and having its remaining surfaces provided with a conductive coating and electrically connected to a conductive member through which electrical charges can leak away from the mirror.

9. An electron discharge tube according to claim 1, in which said concave mirror and said phosphor screen are mounted in a hollow frame within said vacuum envelope.

10. An electron discharge tube according to claim 9, in which said hollow frame is a metal cylinder which serves also as a heat-dissipating device.

11. A projection television or radar receiver including an electron discharge tube according to claim 1 and having a viewing screen comprising an image-intensifier.

12. A colour television receiver employing a plurality of electron discharge tubes according to claim 1, said tubes having phosphor screens which provide images of different colours and being arranged so that the projected component colour images are superimposed on a common viewing screen.

13. An electron discharge tube according to claim 6, in which said heat-dissipating device is a cylinder provided with fins.

14. An electron discharge tube according to claim 6, in which said heat-dissipating device has a blackened surface to improve its heat-radiation characteristics.

15. An electron discharge tube according to claim 1, comprising a locating surface substantially perpendicular to the optical axis and at least one locating member connected to said support member and making contact with said locating surface around the optical axis, whereby said support member is constrained with respect to movements along said optical axis.

16. An electron discharge tube according to claim 15, including resilient means whereby said pin is held in said socket and whereby said locating member is maintained in contact with said locating surface.

17. An electron discharge tube according to claim 15, in which said socket is formed in the transparent face of said vacuum envelope and said pin is fixed to said support member containing the mirror and the screen by means of spider arms.

18. An electron discharge tube according to claim 17, in which an annular projection rigid with said spider arms abuts against the transparent face of said vacuum envelope.

19. An electron discharge tube according to claim 17, in which a plurality of projections rigid with said spider arms abut against the transparent face of said vacuum envelope.

20. An electron discharge tube for a projection television or radar receiver or an oscilloscope, comprising a vacuum envelope having a transparent face and within which is located an electron gun, a convex phosphor screen which receives electrons from said electron gun, and a concave mirror of substantially spherical curvature receiving light rays from that side of said phosphor screen which is struck by electrons from said electron gun and reflecting said light rays through the transparent face of said vacuum envelope, said phosphor screen and said concave mirror being mounted within a common support member having an annular flexible edge, and said vacuum envelope having an annular recess terminating in an end wall, said flexible edge being located in said annular recess and abutting against said end wall, whereby said support member is constrained with respect to both movement transverse to and movement along the optical axis of said screen and mirror.

21. An electron discharge tube according to claim 20, including resilient means whereby said annular flexible edge is held in abutment with said end wall.

22. An electron discharge tube according to claim 20, wherein said annular edge is provided with a plurality of longitudinal slits.

23. A method of manufacturing an electron discharge tube comprising a glass vacuum envelope having a transparent face and within which is located an electron gun, a convex phosphor screen which receives electrons from the electron gun, and a concave mirror of substantially spherical curvature which receives light from that side of the phosphor screen which is struck by electrons from the electron gun, and further comprising an optical correcting element mounted outside said vacuum envelope, which method comprises the steps of positioning the optical components mounted inside the envelope in axial alignment with a first part of a common locating member which is rigid with said envelope, fixing said internal components against movement transverse to the axis of said envelope, positioning the optical components mounted outside said envelope in axial alignment with a second part of said common locating member coaxial with said first part, and fixing said external components against movement transverse to the axis of said envelope, whereby said internal and external optical components are axially aligned with one another.

24. A method of manufacturing an electron discharge tube comprising a glass vacuum envelope having a transparent face and within which is located an electron gun, a convex phosphor screen which receives electrons from the electron gun, and a concave mirror of substantially spherical curvature which receives light from that side of the phosphor screen which is struck by electrons from the electron gun, and further comprising an optical correcting element mounted outside said vacuum envelope, which method comprises the steps of forming a central aperture in the inner surface of the transparent face of said envelope, positioning the optical components mounted inside the envelope in axial alignment with said central aperture, fixing said internal components against movement transverse to the axis of said envelope, positioning the optical components mounted outside said envelope in axial alignment with the rim of said transparent face, and fixing said external components against movement transverse to the axis of said envelope whereby said internal and external optical components are axially aligned with one another.

25. A method according to claim 24, comprising the steps of axially aligning deflection coils associated with said tube with respect to said transparent face, and fixing said deflection coils against movement transverse to the axis of said envelope.

References Cited in the file of this patent

UNITED STATES PATENTS

| | | |
|---|---|---|
| 2,091,152 | Malpica | Aug. 24, 1937 |
| 2,435,296 | Szegho | Feb. 3, 1948 |
| 2,448,476 | Szegho | Aug. 31, 1948 |
| 2,453,003 | Edwards | Nov. 2, 1948 |
| 2,466,329 | Samson | Apr. 5, 1949 |
| 2,467,462 | Brown | Apr. 19, 1949 |
| 2,473,320 | Wynn | June 14, 1949 |
| 2,482,151 | Boyle | Sept. 20, 1949 |
| 2,520,190 | Amdursky | Aug. 29, 1950 |
| 2,654,854 | Seright | Oct. 6, 1953 |
| 2,663,012 | Beers | Dec. 15, 1953 |
| 2,692,346 | Trad | Oct. 19, 1954 |